(12) United States Patent
Gao et al.

(10) Patent No.: US 7,552,053 B2
(45) Date of Patent: Jun. 23, 2009

(54) TECHNIQUES FOR AIDING SPEECH-TO-SPEECH TRANSLATION

(75) Inventors: Yuqing Gao, Mount Kisco, NY (US); Hong-Kwang Jeff Kuo, Pleasantville, NY (US); Bowen Zhou, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 11/208,989

(22) Filed: Aug. 22, 2005

(65) Prior Publication Data

US 2007/0043567 A1 Feb. 22, 2007

(51) Int. Cl.
*G10L 13/00* (2006.01)
(52) U.S. Cl. ..................................................... 704/258
(58) Field of Classification Search .............. 704/3–258
See application file for complete search history.

(56) References Cited

U.S. PATENT DOCUMENTS

| | | | |
|---|---|---|---|
| 5,293,584 A * | 3/1994 | Brown et al. ................. | 704/227 |
| 5,311,429 A * | 5/1994 | Tominaga ..................... | 704/10 |
| 5,815,196 A * | 9/1998 | Alshawi ................... | 348/14.12 |
| 5,937,383 A * | 8/1999 | Ittycheriah et al. .......... | 704/255 |
| 5,956,668 A | 9/1999 | Alshawi et al. ................. | 704/2 |
| 6,022,222 A * | 2/2000 | Guinan ........................ | 434/169 |
| 6,161,082 A * | 12/2000 | Goldberg et al. ............... | 704/3 |
| 6,243,669 B1 * | 6/2001 | Horiguchi et al. .............. | 704/9 |
| 6,278,968 B1 | 8/2001 | Franz et al. ..................... | 704/3 |
| 6,282,507 B1 | 8/2001 | Horiguchi et al. .............. | 704/3 |
| 7,054,804 B2 * | 5/2006 | Gonzales et al. ............... | 704/8 |
| 7,295,965 B2 * | 11/2007 | Haigh et al. ................... | 704/9 |
| 2003/0115062 A1 * | 6/2003 | Walker et al. ............... | 704/258 |
| 2005/0125218 A1 * | 6/2005 | Rajput et al. .................... | 704/8 |

FOREIGN PATENT DOCUMENTS

| | | |
|---|---|---|
| EP | 1045373 | 12/2004 |
| JP | 2004362132 | 12/2004 |

* cited by examiner

*Primary Examiner*—Michael N Opsasnick
(74) *Attorney, Agent, or Firm*—Ryan, Mason & Lewis, LLP

(57) ABSTRACT

Techniques for assisting in translation are provided. A speech recognition hypothesis is obtained, corresponding to a source language utterance. Information retrieval is performed on a supplemental database, based on a situational context, to obtain at least one word string that is related to the source language utterance. The speech recognition hypothesis and the word string are then formatted for display to a user, to facilitate an appropriate selection by the user for translation.

1 Claim, 4 Drawing Sheets

TECHNIQUES FOR AIDING SPEECH-TO-SPEECH TRANSLATION

STATEMENT REGARDING FEDERALLY SPONSORED RESEARCH OR DEVELOPMENT

This invention was made with Government support under Contract Number N66001-99-2-8916 awarded by the Defense Advanced Research Projects Agency (DARPA). The Government has certain rights in this invention.

FIELD OF THE INVENTION

The present invention relates to language technologies, and, more particularly, relates to translation techniques.

BACKGROUND OF THE INVENTION

Translation systems, such as, for example, speech-to-speech translation systems can be difficult and slow to use because automatic speech recognition, understanding, and translation technologies are presently imperfect and may be prone to errors under adverse conditions, such as in noisy environments, or when a user is unaware of the contents of the system vocabulary. Performance can be somewhat enhanced by employing better signal capture technologies, such as improved microphones, employing better algorithms for training robust statistical models, and the like; however, such techniques cannot completely solve the problems with speech-to-speech translation systems.

Another approach is to train users extensively in the use of a given system. This may result in successful compensation for a mismatch between machine capabilities (such as vocabulary) and the expectations of a user. However, such extensive training is quite costly.

Several strategies have been proposed in various translation systems for addressing the potential for errors. For example, U.S. Pat. No. 6,282,507 to Horiguchi et al. discloses a method and apparatus for interactive source language expression recognition and alternative hypothesis presentation and selection. Multiple recognition hypotheses in a source language are generated in response to a spoken language input. U.S. Pat. No. 6,278,968 to Franz et al. discloses a method and apparatus for adaptive speech recognition hypothesis construction and selection in a spoken language translation system. A number of ordered recognition hypotheses are generated and a user selects from the recognition hypotheses. User review of a list of speech recognition results, with no guarantee of correct translation of the selected input, may be burdensome on the user.

In view of the foregoing, there is a need in the prior art for techniques to assist translation systems, wherein accuracy and/or convenience can be enhanced.

SUMMARY OF THE INVENTION

Principles of the present invention provide techniques useful in connection with translation, such as speech-to-speech translation. An exemplary method for translation of a source language utterance of a first user, according to one aspect of the present invention, includes obtaining a speech recognition hypothesis corresponding to the source language utterance. The exemplary method can further include the step of performing information retrieval on a supplemental database, based on a situational context, to obtain at least one word string that is related to the source language utterance. The method can still further include the step of formatting the speech recognition hypothesis and the word string for display, so as to facilitate an appropriate translation selection from among the speech recognition hypothesis and the at least one word string.

In another aspect, an exemplary computer-implemented method for assisting machine translation can include the step of monitoring a dialog of at least one user with a translation apparatus. The method can further include the step of analyzing the dialog to develop at least one suggestion for the next word string that is likely to be desired to be translated. The method can still further include the step of formatting the next word string for display to the user.

One or more exemplary embodiments of the present invention can include a computer program product, and/or can be implemented using a computer system including a memory and at least one processor coupled to the memory operative to perform method steps in accordance with one or more aspects of the present invention.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
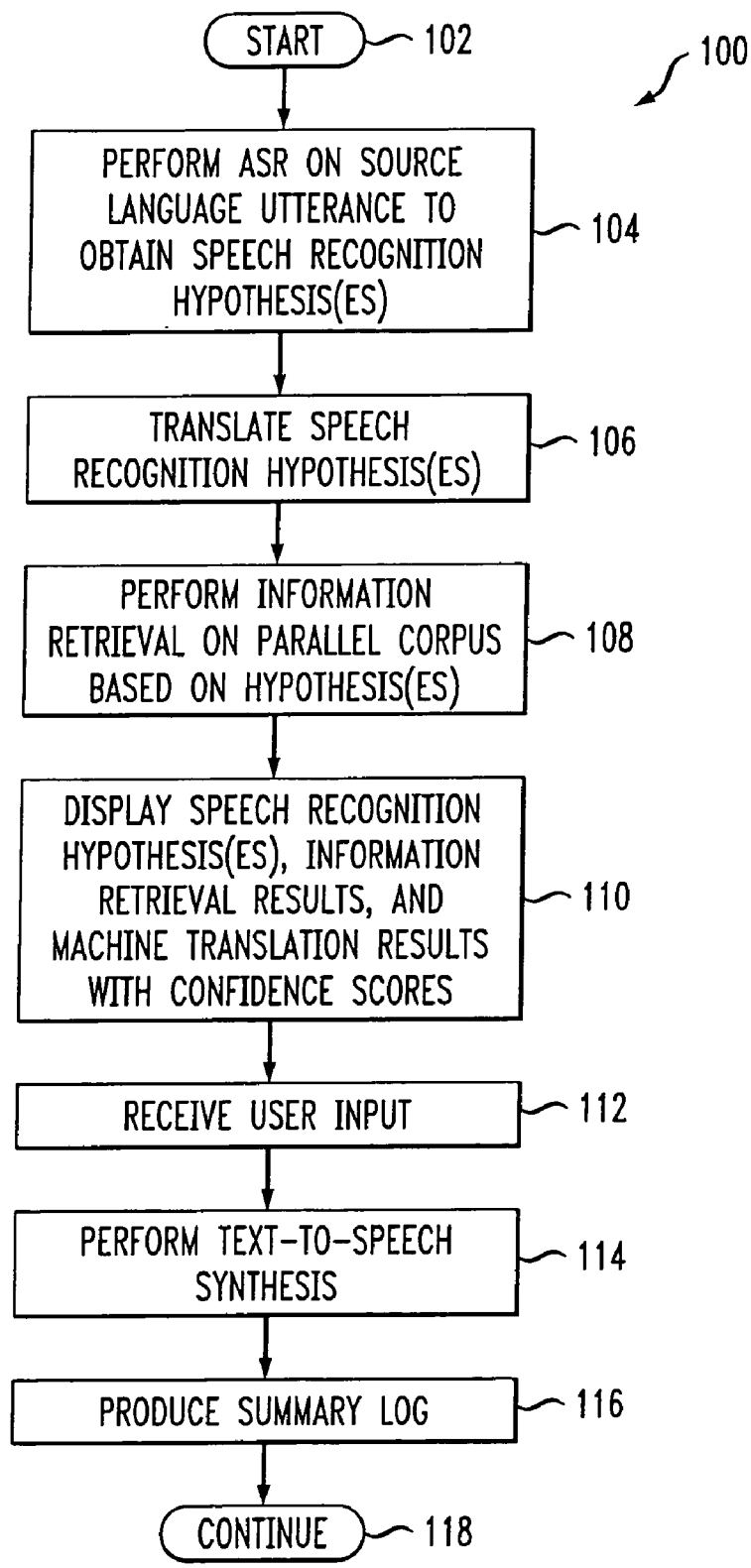
FIG. 1 is a flow chart depicting an exemplary method of assisted translation according to one aspect of the present invention.

Attention should now be given to FIG. 1, which presents a flow chart 100 of an exemplary method (which can be computer-implemented), in accordance with one aspect of the present invention, for translation of a source language utterance of a first user. The start of the method is indicated by block 102. A speech recognition hypothesis corresponding to the source language utterance of the first user can be obtained. As indicated at block 104, such a hypothesis can be obtained by performing automatic speech recognition (ASR) on the source language utterance to obtain the speech recognition hypothesis. It should be noted that instead, the hypothesis could be obtained externally and supplied to a program, method, process or apparatus implementing techniques of the present invention. Furthermore, as will be discussed more fully below, one might use an N-best word list or word lattice with probabilities; this possibility is indicated in block 104 since a hypothesis or hypotheses may be obtained, as desired.

As indicated at block 106, the speech recognition hypothesis or hypotheses can be translated, for example, using machine translation. As indicated at block 108, information retrieval can be performed on a supplemental database (such as, e.g., a parallel corpus), based on a situational context (such as, e.g., the speech recognition hypothesis), to obtain at least one word string. As used herein, a word string encompasses a single word, a phrase, or a sentence. The word string can be related to the source language utterance. For example, in one aspect of the invention, the supplemental database is the aforementioned parallel corpus, and is constructed from training data in the form of previously-translated word strings and their translations. In such a case, the at least one word string can be one of the previously translated word strings and can be related to the source language utterance in the sense of being closely matched thereto. By way of example and not limitation, where the user states "I have been taking this medicine for three days" the closest matching sentence in the parallel corpus might be, for example, "I have taken this pill for three days."

The speech recognition hypothesis and the previously-translated word string can be formatted as choices for display, so as to facilitate an appropriate selection by the first user. Such selection can be designated as a translation selection, as the first user can make a determination which of the choices he or she wishes to use the translation of. For example, the user can compare the closest matching sentence from the parallel corpus, since he or she is familiar with the source language, to what he or she intended, and can therefore pick the appropriate source phrase with "guaranteed" translation (as discussed below) where such phrase closely matches the idea he or she was attempting to convey, thus eliminating translation uncertainty.

The formatted information can be displayed as at block 110, to facilitate user comparison and selection. Such display can be performed by a program, method, process or apparatus implementing techniques of the present invention, or by an external program, method, process or apparatus. Where desired, the displayed choices can be displayed together with confidence scores. The speech recognition hypothesis and its associated machine translation will typically have a less than a 100% confidence score (for example, 80%). However, the selections from the parallel corpus normally have "guaranteed" (i.e. 100%) translation results. Thus, the user can take this into account as discussed above: he or she may select a word string from the parallel corpus that is close to, but not exactly, what he or she meant, but which overall may yield a more desirable dialog because it will have been accurately translated. The receipt of user input, for example, in the form of the aforementioned selection among alternatives, is indicated at block 112.

As indicated at block 114, text-to-speech synthesis can be performed on the selected alternative. Such text-to-speech synthesis can be performed, e.g., depending on the selection by the user, on the translation result of the speech recognition hypothesis, or on an associated stored translation of a previously translated word string from the parallel corpus. At block 116, a summary or log can be produced. Such a log can include a record of interactions of the first user with the system implementing the exemplary method. Typically, a system implementing the exemplary method may be employed for use by a second user, as well as the first user, each of whom will speak a different language. Thus, the log can include the interactions of the first and second users in one or both of a source language as spoken by the first user and a second language spoken by the second user. It should be noted that when the second user makes an utterance that it is desired to translate, such utterance is in that instant the "source" language and the translation into the language of the first user will constitute the "target" language at that moment. A pass through the method is indicated at block 118, where one may continue with additional interactions, or may stop if the dialog is complete.

It will be appreciated that the flow chart 100 of FIG. 1 is exemplary in nature, and the method steps may be performed in any convenient order. Not all the depicted steps need be performed by the program, method, process or apparatus implementing techniques of the present invention. For example, as noted above, the automatic speech recognition of block 104 can be performed by an external program, method, process or apparatus, as can the display of block 110. Further, by way of example and not limitation, the translation step 106 could be performed by a separate program, method, process or apparatus. Translation could be performed before the display of the results, such that the confidence scores would be available. However, if desired, translation could be performed after the display. As noted translation can be done before or after selection of an alternative by the user. Where previously translated word strings are employed, translations for such word strings are already available. Where the user seeks to translate, for example, the speech recognition hypothesis or hypotheses, it is believed preferable that such translation be done before the user makes his or her selection such that (as just discussed) the confidence scores, and if desired the target phrases, will be available to the user. However, in some aspects or implementations of the invention, if translation were slower due to resource constraints or otherwise, the translation of the speech recognition hypothesis could, if desired, be delayed until after user selection.

Again by way of example and not limitation, techniques of the present invention could be applied based on obtaining the speech recognition hypothesis from an external source, performing information retrieval on the parallel corpus (or other supplemental database) as indicated at block 108, and then formatting the speech recognition hypothesis and the previously translated word string from the parallel corpus so as to facilitate subsequent display and selection by an external program, method, process or apparatus. The aforementioned parallel corpus can include indexed training data. Thus, since such a corpus includes training data, for example, in the form of word strings in a source language and corresponding translated word strings in a target language, the translation accuracy is 100% because the corpus itself contains the training data on which the system is trained. In the information retrieval step 108, a number of previously-translated word strings could be obtained (for example, an N-best match in the information retrieval process). Such choices could be based on a close match to the speech recognition hypothesis. However, as discussed below, other possible choices can be displayed based on a relationship, but not necessarily a close match, to the speech recognition hypothesis. Such multiple previously-translated word strings can be displayed in the displaying step 110, together with the speech recognition hypothesis, and each can include an associated confidence score.

As noted, the speech recognition hypothesis and the previously translated word strings can, if desired, also be displayed with the corresponding translations into the target language. This may be beneficial where the user has some knowledge of the target language. However, where the user does not have such knowledge, display of such translations may result in unnecessary clutter and complication, and may not be appropriate. Thus, if the user does not know the target language, and screen space is limited, it may not be useful to display the translations. As discussed, where the user has at least a partial knowledge of the target language, the translations may be helpful. For example, a user with minimal knowledge of the target language might be able to select a better translation in the case of an ambiguous word such as "where is the tank?"—"tank" could be mean "water tank" or "armored vehicle" and the user may be better able to select the correct choice if he or she can see the translation.

In a preferred approach, the machine translation and information retrieval on the supplemental database, such as the parallel corpus, are performed in parallel. Machine translation is performed, based on the recognition hypothesis or hypotheses, and the information retrieval on the parallel corpus results in source and target language pairs. The user is then presented with two sets of translation options; one is the machine translation with some confidence score, typically less than 100%, while the other is the information retrieval-based translation result(s) normally with 100% translation confidence. In the latter case, the source language part may not be exactly what the speaker meant. Again, as noted, if relatively slow translation techniques were used or computing resources were extremely limited, one might decide to defer the translation until after selection. Displaying both the machine translation and parallel corpus results allows the user to make a well informed decision. If the recognition hypothesis is correct and the machine translation confidence score is relatively high, for example, 90%, the user may select a machine translation output to synthesize. This might be bolstered if the information retrieval selection is not too close to what the user meant. Conversely, if the opposite were true, the user might select the parallel corpus part.

With regard to step 104, the automatic speech recognition could be performed, for example, to obtain an N-best result. In such case, the step of performing information retrieval in block 108 could include taking the speech N-best result as a query in a weighted combination, and then searching the index training data based on the query. It should be understood that the discussion of a speech N-best result is exemplary in nature and other speech recognition techniques can be employed, such as, for example, techniques yielding word hypothesis lattices. Further, while the use of N-best hypotheses and a lattice of recognition hypotheses have just been discussed, it will be appreciated that a one-best hypothesis may also be employed where desired. Thus, techniques of the present invention can be employed on a single speech recognition hypothesis, or on a number of speech recognition hypotheses resulting from the use of, for example, the just-discussed word N-best list or word lattice (with probabilities) as the output from the speech recognizer, that will be processed using techniques of the present invention.

One way of developing the alternative suggestions from the supplemental database is via an information retrieval process. A speech N-best result can be taken as the query in a weighted combination and a search can be performed over an indexed database built from some, or preferably all, of the training data. The supplemental database, such as the parallel corpus, can be indexed using techniques such as those employed for indexing World Wide Web pages. A parallel corpus with indexing is only one kind of supplemental database that can be employed. Supplemental database contents could also, or alternatively, include logged conversation data, keywords, and the like, such as discussed below with regard to FIGS. 2-4, which detail certain additional kinds of suggestions that can be generated to assist translation, in accordance with various techniques of the present invention. Further, the speech recognition hypothesis is only one kind of situational context that can be taken into account by techniques of the present invention. The situational context could also, or alternatively, include previous dialog history, cues, and the like, further discussion of which is also presented below with respect to FIGS. 2-4. Yet further, the suggested word string related to the source language utterance could be the closest match in the parallel corpus, but could also be another choice or piece of information that may be helpful, with further discussion again to be provided with respect to FIGS. 2-4.

Figure 2:
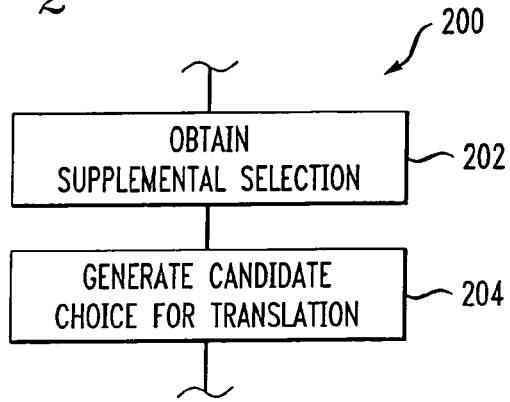
FIG. 2 is a flow chart showing exemplary method steps, according to another aspect of the present invention, of providing a possible choice for a subsequent word string to be translated, responsive to a supplemental user selection.

FIG. 2 shows a flow chart 200 of exemplary optional method steps, in accordance with an aspect of the present invention, which can be employed to assist machine translation. In step 202, a supplemental user selection is obtained. The supplemental user selection can be a selection of at least one word in the choices discussed above. That is, the user can select one or more words contained within the speech recognition hypothesis and/or the word strings as discussed above. In step 204, responsive to the selection from step 202, at least one candidate choice can be generated for a subsequent word string to be translated. For example, a user can click on (or otherwise select) one or more words in the aforementioned choices to generate the next candidate input. Such candidate can be generated, for example, using a retrieval search based on key words ordered by scenario relevance. Furthermore, the selection can be logged for subsequent predictive use. Other suggested choices and predictive capabilities can be implemented, for example, using a dialog model that predicts likely sentences given the past dialog history, as well as correlations of different sentences (that is, if a user says X, he or she would most likely also say Y as well).

Figure 3:
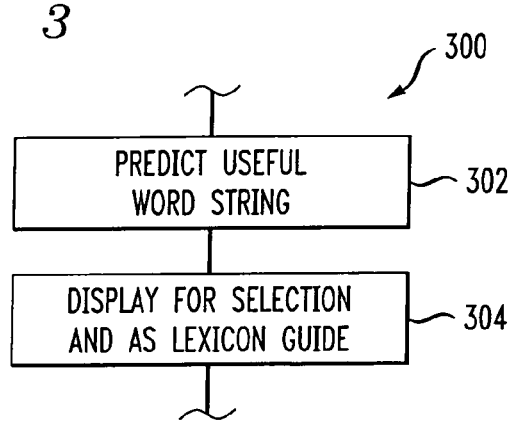
FIG. 3 is a flow chart of an exemplary method, according to yet another aspect of the present invention, for predicting a word string likely to be useful in the future, based on a dialog model.

FIG. 3 shows a flow chart 300 of exemplary method steps, according to another aspect of the present invention, useful to assist translation. In accordance with step 302, one can predict at least one future time word string that is likely to be useful in a future time, based on a dialog model of past dialog history and sentence correlation. In accordance with step 304, one can display the future time word string in a format to facilitate selection, by a first user, of the future time word string for translation. For example, a system employing the illustrative method steps in FIG. 3 could suggest likely word strings that might be useful in the future, based on a dialog model that predicts likely sentences given past dialog history and correlations of different sentences. The display of the future time word string can guide the user to employ a desirable lexicon in subsequent dialog. For example, if the user has mentioned "pill" and the system responds with a suggested future time word string using the terminology "medicine," the user will likely know to use the word "medicine," in the future, where appropriate, rather than "pill."

Figure 4:
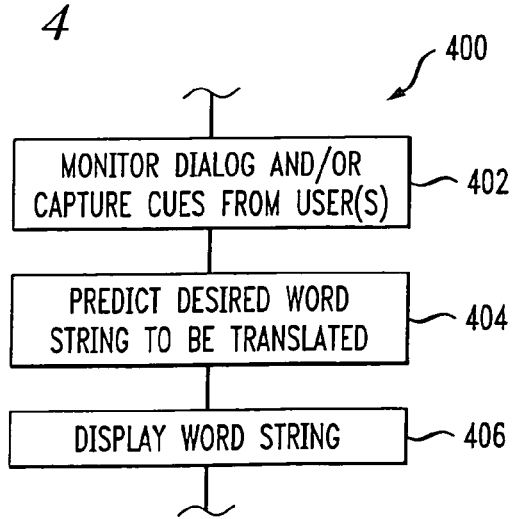
FIG. 4 is a flow chart of an exemplary method, according to still another aspect of the present invention, for capturing cues from a user dialog and predicting at least one word string likely to be desired for subsequent translation based on the cues.

Attention should now be given to FIG. 4, which depicts a flow chart 400 of exemplary method steps for assisting machine translation, according to still a further aspect of the present invention. As indicated at step 402, a dialog of one of more users with a translation system can be monitored, and/or cues from one or more users can be captured as the user or users interact with the translation system. As indicated at step 404, the dialog and/or cues can be analyzed, in order to predict or suggest a word string to be translated in the future (for example, next), as desired by the first or second user or other users. Such prediction can be formatted for display, and if desired can be displayed to at least one of the users as indicated at step 406. Again, as discussed above with respect to FIG. 1, external programs, methods, processes or apparatuses can perform the display if desired. Thus, in one aspect, cues from both parties can be captured to predict the next most likely word string or strings that either of the users is likely to say next.

The techniques illustrated in FIGS. 2-4 can be the basis for stand-alone programs, methods, processes or apparatuses or can be performed in parallel and/or in series, in any desired combination, with the exemplary method steps illustrated in FIG. 1. Further, any of the exemplary methods depicted in FIGS. 2-4, like the exemplary method depicted in FIG. 1, can be computer-implemented.

In view of the foregoing, it will be appreciated that one or more exemplary embodiments of the present invention provide techniques for speech-to-speech translation supplemented by an intelligent aid that has predictive capabilities to smooth the communication process, despite possible speech recognition or translation errors. In one or more aspects, exemplary techniques according to the invention can provide choices on a screen that a user can select from, including hypotheses of what a user might have meant when he or she just spoke. Such a list is not limited to N-best speech recognition results, but includes material from a supplemental database, such as a parallel corpus with word strings that are guaranteed to be correctly translated. Furthermore, in one or more aspects of the present invention, a user can be provided with choices regarding what he or she may wish to say next, based on a dialog history of interactions of one or more users in a previous conversation. Such choices also assist in guiding the lexical choice of the user. Employing one or more techniques of the present invention can result in a smoother conversation flow, significantly enhanced user experience, and/or increased likelihood of a successful conversation, through logical suggestions. Furthermore, one or more aspect of the present invention allow a conversation to be carried on more effectively in noisy environments, since less speech may be required as more interaction can be in the form of clicks, or other non-speech interactions, for selection of various hypotheses or suggestions provided by the system.

In one preferred embodiment, the present invention can take word hypothesis lattices generated by a recognition engine, and display at least two types of suggestions: (a) what the recognizer decoded; and (b) closest matching word strings in the supplemental database, such as the parallel corpus, that have been accurately translated. The user can select from (a) for translation by the translation engine, or can select from (b), with the understanding that in the latter case a correct translation is essentially guaranteed. While the sentences in (b) may not be exactly what the user said, the user can select the one that best represents his or her basic ideas, and because the translation is "guaranteed" to be accurate for listed sentences, it is likely that less miscommunication will result. It should also be noted that programs, methods, processes or apparatuses employing techniques of the present invention can, if desired, be configured such that any of the suggestions can be overridden if they are undesired or inappropriate.

From choices given on the screen, the user can click on, or otherwise select, one or more words in the sentences and certain techniques of the present invention can provide related sentences containing the selected words, from which the user can select his or her next input requiring translation. In addition, the user's choice can be logged by programs, methods, processes or apparatuses employing techniques of the present invention, and can be used in subsequent conversations to better sort out translation candidates and better predict what users may wish to say in the future.

The word strings that have been discussed can be related to the source language utterance in different ways. In one aspect, they can be word strings that are closely matched to the source language utterance, that is, close in meaning to the source language utterance. However, the word strings can be related in other ways. For example, they could constitute word string choices that will likely to be useful later in the same scenario but which may be un-related in meaning to the source language utterance (i.e., un-related in meaning and yet still related in the sense that they will be useful later in the same scenario). By way of example, a user might say "How can I get to the train station?" Techniques of the present invention could provide, for example, choices such as "what time is the next train into the city?" In this way, a user can be informed regarding what he or she might later say when the dialog comes to the point where such information is needed. This type of suggestion can again help the user select a more suitable lexicon for the system, and thus improve speech recognition and/or translation performance in the future.

Predictive capabilities can, as noted, take advantage of the dialog history; they may even suggest most likely word strings that the user may say next even before the user says anything. Appropriate cues can be captured from one or both parties in a conversation. For example, person A asks "Are you hungry?" Techniques of the present invention could offer choices of "Yes" or "No" for person B to respond with (for example, by pointing or clicking on the choice on a display screen). Suppose the last thing person A said was "do you have diabetes?" One choice offered to person A on the next turn could be "do you have any heart problems?" Another example could arise during a structured interview; if A asked "are you married?" while interviewing B, and B responded "yes," the system could suggest one or more spouse-related questions such as "what is your spouse's name?" required for such a structured interview. Conversely, if B had responded "no," the system could suggest questions appropriate for the next part of the structured interview.

Figure 5:
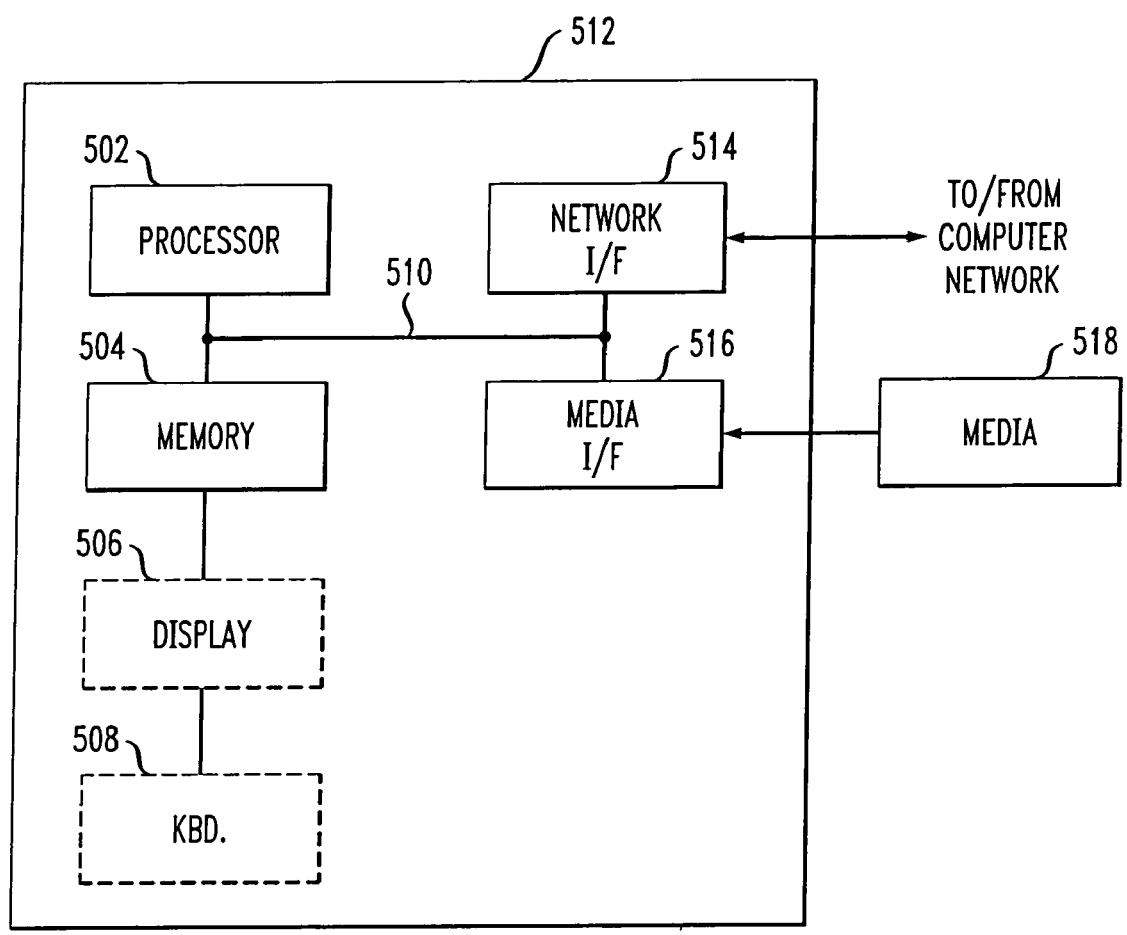
FIG. 5 depicts an exemplary computer system which can be used to implement one or more embodiments or aspects of the present invention.

A variety of techniques, utilizing dedicated hardware, general purpose processors, firmware, software, or a combination of the foregoing may be employed to implement the present invention. At present, it is believed that the preferred implementation is in software. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (e.g., hard drive), a removable memory device (e.g., diskette), a flash memory and the like. In addition, the phrase "input/output interface" as used herein, is intended to include, for example, one or more mechanisms for inputting data to the processing unit (e.g., mouse), and one or more mechanisms for providing results associated with the processing unit (e.g., printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. Such software could include, but is not limited to, firmware, resident software, microcode, and the like.

Furthermore, the invention can take the form of a computer program product accessible from a computer-usable or computer-readable medium (e.g., media 518) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (e.g. memory 504), magnetic tape, a removable computer diskette (e.g. media 518), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 502 coupled directly or indirectly to memory elements 504 through a system bus 510. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, e.g., application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Figure 6:
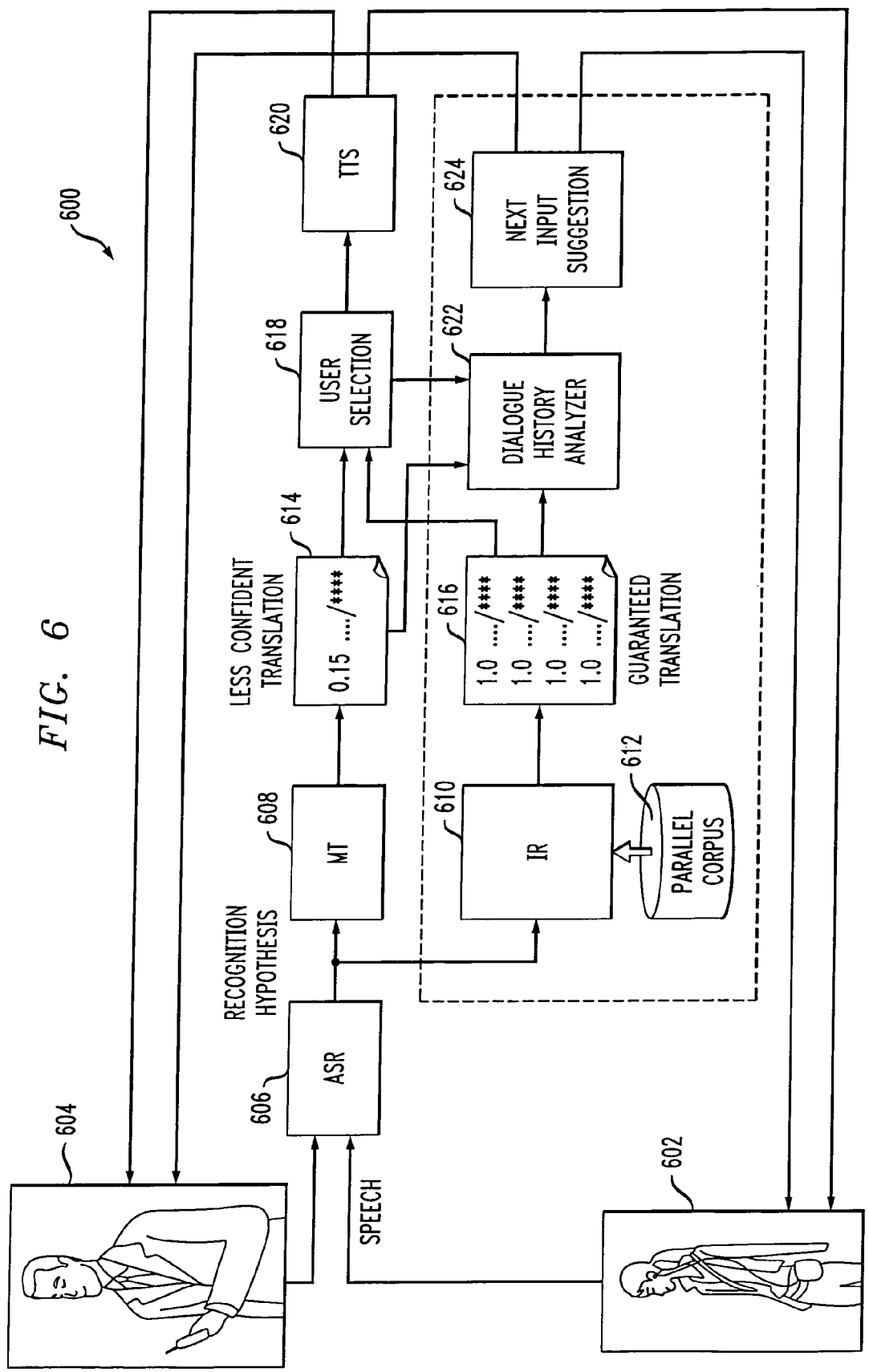
FIG. 6 is a block diagram of an exemplary translation apparatus employing techniques in accordance with aspects of the present invention.

FIG. 6 depicts a block diagram of a translation apparatus 600 employing exemplary techniques in accordance with various aspects of the present invention. In view of the above discussion of FIG. 5, it will be appreciated that the various elements of FIG. 6 can be implemented, for example, on the exemplary computer system depicted in FIG. 5. Techniques of the present invention can be employed, for example, on speech-to-speech translation systems implemented, for example, on a laptop computer or on a personal digital assistant or other handheld computer that is resource limited, and may be employed in a noisy environment. The apparatus 600 can include an input/output module that is configured to obtain a speech recognition hypothesis corresponding to a source language utterance. The utterance can be, for example, from first user 602 or second user 604. Where desired, an automatic speech recognition module 606 can be employed to obtain the hypothesis from the source language utterance. As discussed above, such an automatic speech recognition module can be included in a program, method, process or apparatus implementing the present invention, or could be external thereto.

The aforementioned input/output module could be formed, for example, by appropriate interfaces, elements, and/or software modules implemented on or in connection with the system 512 discussed above. A machine translation module 608 can be coupled to the input/output module (or to the automatic speech recognition module where present), and can be configured to translate the speech recognition hypothesis into the target language, to obtain a translated hypothesis. An information retrieval module 610 can be coupled to the input/output module, or to the automatic speech recognition module 606 where present, in order to obtain the speech recognition hypothesis. The information retrieval module 610 can be provided with an appropriate interface for coupling to a supplemental database such as parallel corpus 612. Module 610 can be configured to perform information retrieval on the parallel corpus 612, based on the speech recognition hypothesis, to obtain at least one source language word string contained in the corpus 612 that is related to the source language utterance.

It should be noted that the apparatus 600 is exemplary in nature, and in a more general case, the parallel corpus 612 could be a supplemental database of the kind discussed above with regard to FIG. 1. Further, the information retrieval could be performed based on a situational context of the kind discussed above.

The input/output module, including appropriate programs and/or elements as depicted in FIG. 5, can be configured to format the speech recognition hypothesis, and at least one of the source language word strings, for display to one or more of the users 602, 604. Further, the input/output module can be configured to obtain a user selection from among the choices, and to format appropriate target language word strings that correspond to the selection (for example from the parallel corpus or the machine translation), for text-to-speech synthesis in the target language. Blocks 614, 616 are exemplary illustrations of displays that can be made to users 602, 604. In block 614, the dots represent the speech recognition module's estimation of the source language utterance, while the asterisks represent the machine translation module's estimated translation thereof. In the example shown in block 614, the choice has only a 15% confidence rate (more typically, one might expect, say, an 80% confidence rate). As shown at block 616, the selected word string or strings from the parallel corpus have a 100% confidence rate in the translation, as indicated by the notation "1.0" and the notation "guaranteed translation." User selection via the input/output module, and subsequent text-to-speech synthesis, are indicated at blocks 618, 620 respectively.

If desired, a dialog history analyzer 622 can be provided. Such analyzer can be coupled to the input/output module and can be configured to monitor dialog of one or both of users 602, 604 with the apparatus 600, to analyze the dialog in order to develop at least one suggestion for the next word string that it will be desired to translate, and then to format the next word string for display to the user by the input/output module. Interaction with the user regarding the suggestion for the next word string is indicated at block 624. The dialog history analyzer can implement, for example, techniques as shown in FIGS. 2-4 above; for example, the dialog monitoring and/or capturing as depicted in FIG. 4. The dialog history analyzer can determine what the user or users have said recently, and then generate suggestions based on key words. For example, if a question has been asked, the next suggestion could be, for example, "yes" or "no" in the target language. It will appreciated that the dialog history analyzer can deal with a more meaningful history because of the knowledge of user selections; without knowledge of such selections one might be attempting to predict the future based on an incorrect history.

Systems and methods not employing techniques of the present invention have displayed multiple speech recognition hypotheses, but this may be of limited use because it takes more effort to try and select the best one out of the noisy hypotheses. Each sentence may be different from the next by only one or two un-important words, e.g.:

I want to buy a burger.
I wanna buy a burger.
i wanna burger.
want a burger.
i want a a by a burger.
etc.

By way of example, techniques of the present invention can provide "more intelligent" choices, e.g. speaker A says, "I wanna buy a burger," and an exemplary embodiment of program, method, process or apparatus provides choices for speaker A:

1) I want to buy a burger.
2) I want a chicken sandwich.
3) I want a cheese burger.
4) Do you have a special children's meal?
5) Where is the restroom?
etc.

After speaker A selects (3), for example, a device embodying techniques of the present invention could be given to speaker B, who may be given some choices even before he or she speaks:

1) Would you like to have the meal combo?
2) Fine. A cheese burger.
3) Would you like tomato and lettuce on your burger?

Speaker B can choose one of these selections or just say something else instead, such as: "Would you like a cola beverage with your meal?"

Speaker A can then be given a choice even before he or she speaks:

1) Yes.
2) No.
(He or she could also say something else).

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for translation of a source language utterance of a first user, said source language utterance being in a source language, said first user being a speaker of said source language, said method comprising the steps of:

performing automatic speech recognition on said source language utterance to obtain a speech recognition result corresponding to said source language utterance;
performing machine translation on said speech recognition result to obtain a translation result in a target language;
performing information retrieval on a supplemental database, based on said speech recognition result, to obtain multiple retrieved word strings, in said source language, related to said source language utterance, said retrieved word strings having word string translations in said target language associated therewith, said supplemental database comprising a parallel corpus with indexed training data including training word strings in said source language and corresponding translated training word strings in said target language, said step of performing said machine translation being carried out by a translation system trained on said training data of said parallel corpus, said performing of said information retrieval comprising:
  taking said speech recognition result as a query in a weighted combination; and
  searching said indexed training data based on said query;
formatting said speech recognition result and said retrieved word strings in said source language for display to facilitate an appropriate translation selection;
displaying said formatted speech recognition result and said retrieved word strings together with associated translation confidence scores;
obtaining said translation selection, from said first user, among said speech recognition result and said retrieved word strings;
in case said translation selection comprises said speech recognition result:
  displaying said translation result in said target language, and
  performing text-to-speech synthesis on said translation result to sound out said translation result in said target language;
in case said translation selection comprises one of said retrieved word strings:
  displaying a corresponding one of said word string translations, and
  performing text-to-speech synthesis on said corresponding one of said word string translations to sound out said corresponding one of said word string translations in said target language;
predicting:
  at least one future time source language word string likely to be useful for future translation from said source language in a current conversation, and
  at least one future time target language word string likely to be useful for future translation from said target language in said current conversation,
based on a dialog model of past dialog history and sentence correlation from previous conversations of other persons;
displaying said at least one future time source language word string in a format to facilitate selection, by said first user, of said at least one future time source language word string for translation, said at least one future time source language word string being displayed so as to guide said first user to employ a desirable lexicon in subsequent dialog; and
displaying said at least one future time target language word string in a format to facilitate selection, by a second user, of said at least one future time target language word string for translation, said at least one future time target language word string being displayed so as to guide said second user to employ a desirable lexicon in subsequent dialog, said second user being a speaker of said target language.

* * * * *